United States Patent

[11] 3,554,103

| [72] | Inventor | Donald M. Harvey<br>Rochester, N.Y. |
|---|---|---|
| [21] | Appl. No. | 717,759 |
| [22] | Filed | Apr. 1, 1968 |
| [45] | Patented | Jan. 12, 1971 |
| [73] | Assignee | Eastman Kodak Company<br>Rochester, N.Y.<br>a corporation of New Jersey |

[54] AUTOMATIC EXPOSURE CONTROL SYSTEM
4 Claims, 5 Drawing Figs.

[52] U.S. Cl. .................................................. 95/10, 95/64
[51] Int. Cl. ...................................................... G03b 7/08, G03b 9/06
[50] Field of Search ........................................ 95/10C, 11.5, 53, 63, 64

[56] References Cited
UNITED STATES PATENTS

| 3,200,723 | 8/1965 | Topaz ........................... | 95/11.5 |
| 3,205,802 | 9/1965 | Wareham ...................... | 95/11.5 |
| 3,348,460 | 10/1967 | Schmitt ......................... | 95/10(C) |
| 3,353,462 | 11/1967 | Suzuki ........................... | 95/10(C) |
| 3,362,309 | 1/1968 | Cooper, Jr. et al. ........... | 95/10(C) |
| 3,422,738 | 1/1969 | Mori et al. .................... | 95/10(C) |
| 3,440,938 | 4/1969 | Stimson et al. ................ | 95/10(C) |

*Primary Examiner*—John M. Horan
*Assistant Examiner*—Joseph F. Peters, Jr.
*Attorneys*—Robert W. Hampton and Ronald S. Kareken

ABSTRACT: A photographic camera having a diaphragm and a shutter wherein the diaphragm is opened to initiate the exposure and may be stopped at an aperture opening determined by a photoresponsive control device. The exposure is terminated by the movement of the shutter from an aperture uncovering position to an aperture covering position a predetermined time after the diaphragm has been actuated to initiate the exposure.

INVENTOR
DONALD M. HARVEY

AUTOMATIC EXPOSURE CONTROL SYSTEM

BACKGROUND OF THE INVENTION

1. Field of Invention

This invention relates to automatic exposure control used in flash photography.

2. Description of the Prior Art

Automatic exposure control systems employed in cameras generally include a photo electric device which sets the exposure control means according to the level of available light to effect proper exposure of the film. However, there are certain problems that are particularly acute when such systems are used during flash operation of the camera. Unlike available light photography, the exposure time is crucial, because the exposure control settings and the exposure process must be completed within the brief duration of the flash illumination. Also, whereas the light level for an available light exposure is fairly constant over long periods of time, the level of the flash illumination during the exposure time peaks and subsides rapidly. Usually, therefore, flash settings of cameras comprise empirically determined aperture and time settings to account statistically for most flash operation conditions.

SUMMARY OF THE INVENTION

An important aspect of the present invention, however, is in the provision of a system for automatically setting the exposure control means and effecting exposure of the film within the duration of the flash illumination. By providing a variable aperture increasing during exposure, the effective lens aperture approaches the minimum size at which exposure may be made, thereby providing an increased depth of field. The invention broadly comprises a variable diaphragm, shutter means and photo electric means for regulating exposure according to the level of flash illumination. In setting a camera for a flash exposure, the shutter is cocked or set in open aperture position, whereas the diaphragm is normally closed. When exposure is initiated by the camera operation, the diaphragm then acts as an opening shutter, continuously increasing the lens aperture to a maximum size at the peak of the flash illumination. In one embodiment, the diaphragm continues to open until a particular light level is detected, at which time the diaphragm is fixed, and exposure is terminated by the closing of a preset, timed shutter. In another embodiment, the diaphragm continues to open, and when a particular light level is detected by the photo cell, the shutter closes to terminate exposure.

The invention offers several advantages over the known prior art, which are of particular value to the amateur photographer. The main advantage of course is the simplicity of operation coupled with the quality of the resulting photograph. Once the subject range has been set, there remains a "point and shoot" step. The range setting during flash is no longer critical, and may even be dispensed with, since exposures are automatically made at very nearly the maximum depth of field possible. Because of the reciprocity failure phenomenon of photographic film, another advantage of this invention is the elimination of the slight reddening of closeup flash exposures made at very short exposure times. This defect is avoided because such closeup photographs made in accordance with the present invention tend to be at longer exposure times and nearer the peak of the flash illumination.

BRIEF DESCRIPTION OF THE DRAWING

The invention as well as objects and advantages thereof will become apparent to those skilled in the art from the following description of the preferred embodiments, the accompanying drawing forming a part thereof and wherein.

DESCRIPTION OF THE PREFERRED EMBODIMENTS

Since the structural components of a flash camera are generally known, this invention will be described by reference only to those portions of a camera required for an understanding of the invention.

Figure 1:
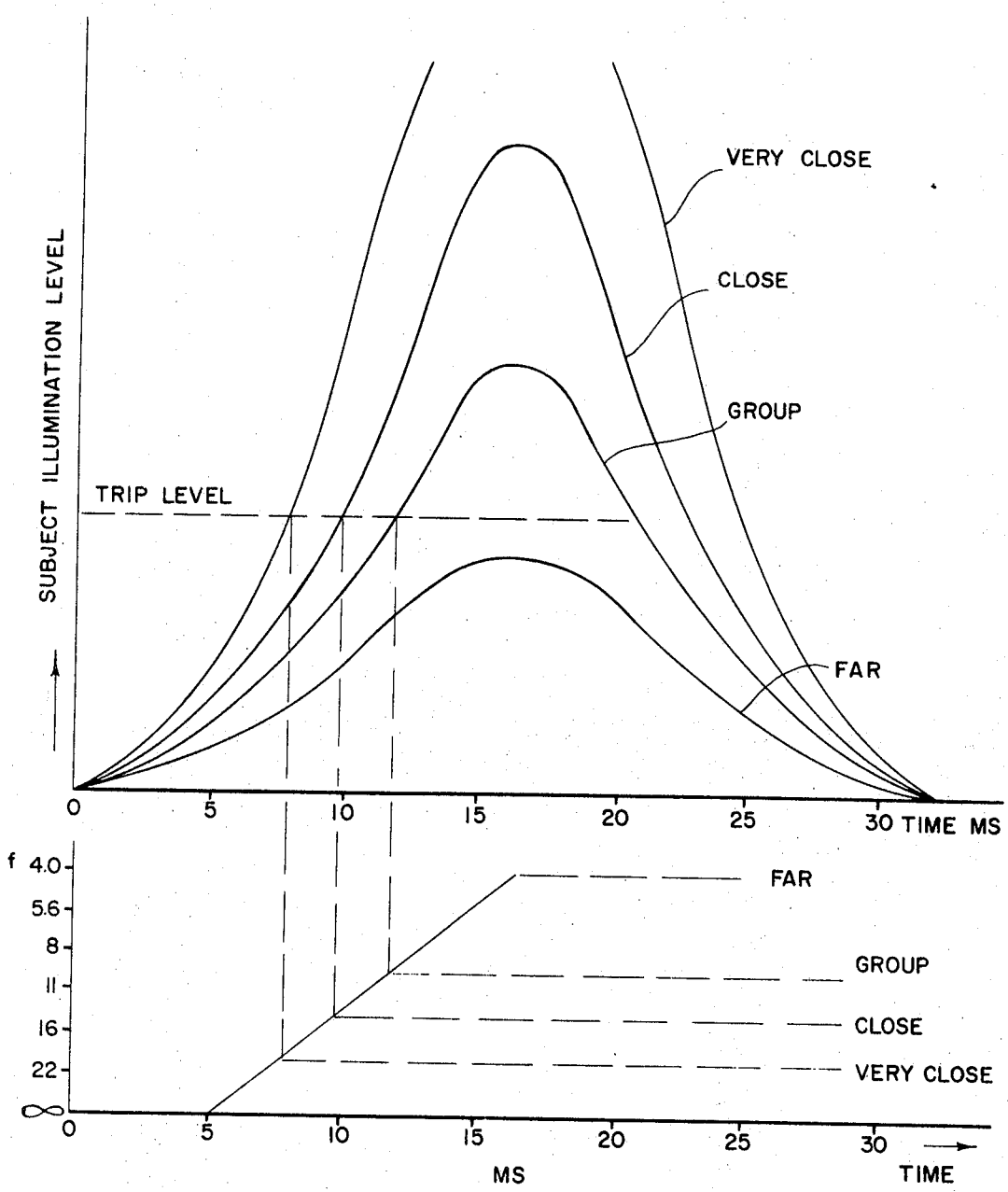
FIG. 1 represents the variation of flash illumination with time for various subject distances and the corresponding aperture values at a given shutter speed.

The invention provides for automatic exposure control wherein such control is accomplished by automatically regulating the setting of the diaphragm aperture during flash exposure. This aperture setting is commonly referred to by its $f$ number, which is the ratio of the focal length of the lens to the diameter of the diaphragm aperture. The upper portion of FIG. 1 shows a theoretical family of curves exhibiting the variation of illumination with time for typical subjects at various distances lighted from a common flash source. The lower portion of FIG. 1 shows the diaphragm settings required for proper exposure of the film at a constant shutter speed for the various subject distances indicated by the curves. These graphs indicate that the diaphragm aperture increases as the subject range increases under similar lighting conditions. This is because the intensity of flash light reflected from the subject back to the camera decreases with subject range.

Figure 2:
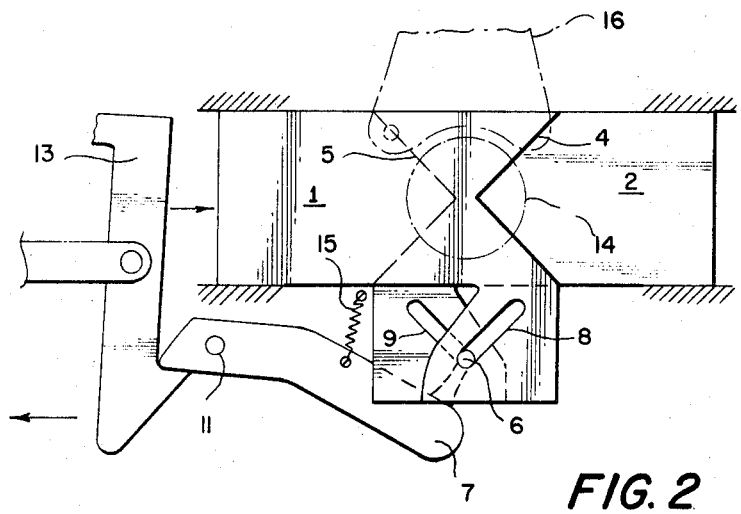
FIG. 2 illustrates a preferred embodiment of the diaphragm assembly associated with the invention, prior to commencement of the exposure process.
Figure 3:
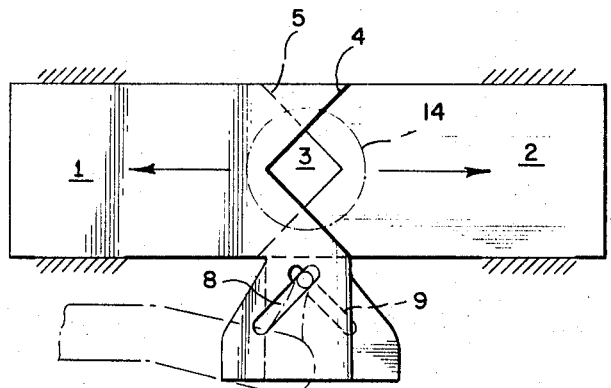
FIG. 3 shows the diaphragm assembly of FIG. 2 during the exposure process.

FIG. 2 shows a detailed illustration of the diaphragm assembly of this embodiment of the invention when the camera is set for operation. Overlapping vanes 1 and 2 are arranged to slide over one another in an opposing reciprocating fashion in restricted paths in a manner to be described. Each vane is provided with a concave V-shaped cutout at the end of the vane closest to the camera objective, and each vane also is provided with an angled aperture control slot. Hence, vane 1 is provided with cutout 4 and slot 8, and vane 2 is provided with cutout 5 and slot 9. The cutouts 4 and 5 cooperate to form a variable aperture 3 when they are superimposed, as shown in FIG. 3. The center of the aperture lies on the optical axis of the camera objective or lens 14. The ends of the vanes which cooperate to form the aperture 3 will hereinafter be referred to as the leading ends of the vanes. Movement of the blades to first commence exposure and then increase the aperture is effected by the movement of control pin 6 positioned in both slots 8 and 9. As shown in FIG. 2 and FIG. 3, pin 6 is fixed to an arm 7, which rotates about a pivot 11 and is biased in a counterclockwise direction by a spring 15. When exposure is commenced by moving the camera release arm 13 clockwise, arm 7 is thereby released to move counterclockwise and pin 6 moves upward, sliding in slots 8 and 9 and thereby causing the vanes 1 and 2 to move outwardly. Thus, an exposure aperture 3 is made as the apexes of cutouts 4 and 5 cross and the aperture increases in size as they separate. The shutter blade 16, which serves solely to terminate exposure, is cocked as for example during film wind, in an open position prior to exposure.

Figure 4:
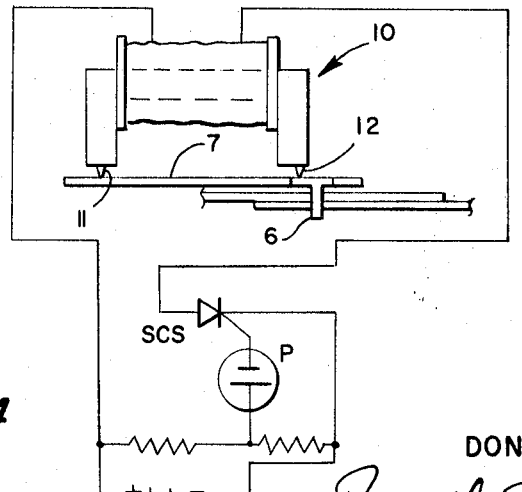
FIG. 4 represents the photoelectric control circuitry of the embodiment of FIG. 2 and the electromagnet assembly for locking the diaphragm at a fixed aperture according to the light level.

FIG. 4 shows the photoelectric trigger circuit associated with this embodiment of the invention. The circuit includes a photocell P which when it detects light of a certain intensity enables current to pass through an electromagnetic assembly 10. Arm 7, which comprises a soft iron magnetizable material, is arranged such that its pivot 11 is one pole of electromagnetic assembly 10. The rotating end of arm 7 slides against the other pole 12 during the exposure operation as explained above. Control of current through the electromagnet is made by an electronic switch SCS. When the proper light level is reached, the voltage generated by the photocell P closes the switch SCS to complete the electromagnetic assembly circuit.

Current is permitted then to pass through electromagnetic assembly 10, and arm 7, which has been rotating about pivot 11, is locked against the pole 12 to terminate rotation and fix the exposure aperture.

The operation of this embodiment of the invention commences with the actuation of diaphragm release 13, which simultaneously closes the flash circuit (not shown) to fire the lamp in a known manner. Arm 7, which is driven by spring 15 is released by the camera operating release 13. Thereupon arm 7 rotates counterclockwise, causing pin 6 to move upwardly in crossed slots 8 and 9. The movement of pin 6 propels diaphragm vanes 1 and 2 outwardly. This movement of vanes 1 and 2 forms the aperture 3 over the lens 14, which increases in size as the vanes 1 and 2 continue their outward movement, as indicated in FIG. 3.

While the diaphragm aperture 3 is increasing in size during the exposure time, the intensity of the flash illumination reflected from the scene to the camera increases. When photocell P in the trigger circuit detects that the intensity of the reflected light has reached a specified sufficient value, it causes switch SCS to close and permit current to pass through electromagnet 10. Since arm 7 is in contact with both poles 11 and 12 of the electromagnetic assembly 10, it is locked in its position at the time the current passes through the electromagnet 10. Thus, aperture 3 can enlarge no further. Since the speed of the closing shutter is constant, shutter blade 16 proceeds to close in the conventional manner at the end of the preset period, and exposure is terminated.

The lower portion of FIG. 1 may also be used to illustrate the present invention by indicating increase in time required to achieve a maximum diaphragm aperture setting according to the light conditions as the subject range increases in the embodiment where the diaphragm aperture continuously increases until the desired aperture is attained.

Thus, the preceding embodiment provides an automatic exposure system operating with a set shutter speed and a variable diaphragm aperture, which increases in size until a specified opening is reached, whereupon the opening process is stopped. This system provides that every exposure will be made at the smallest possible aperture size for nearly maximum depth of field. The system therefore permits one focus setting for all flash shots, and full use of the flash output is achieved.

Figure 5:
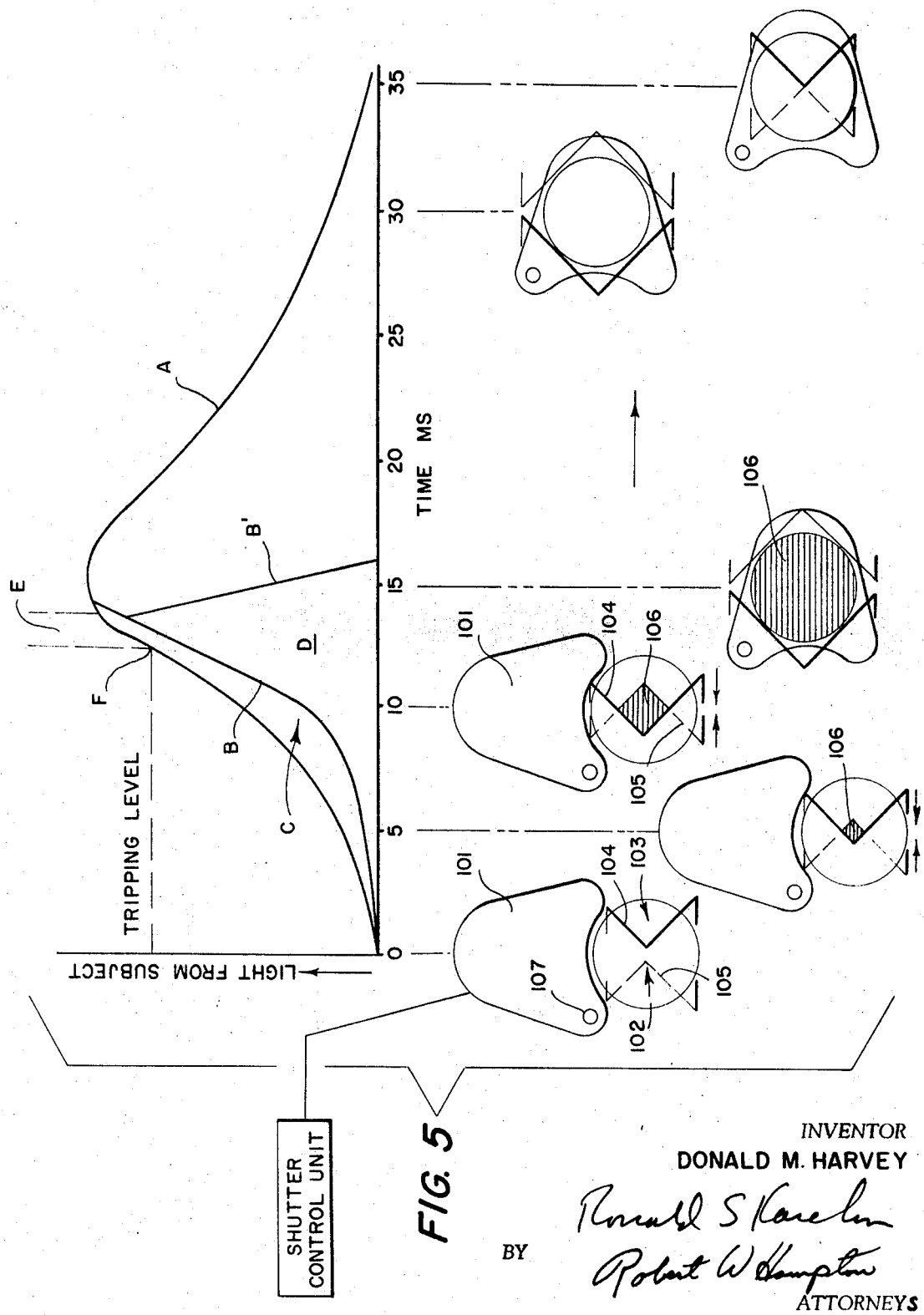
FIG. 5 is a graphical illustration showing the variation of flash illumination with time after actuation of the flash, and the corresponding sequence of operations of a second embodiment of the invention.

A second embodiment of the present invention will be described with reference to FIG. 5. This embodiment incorporates a variable diaphragm aperture which continuously increases in size during the exposure, and a variable speed shutter which is triggered to close when a sufficient intensity of light is detected by a light sensitive element in the trigger circuit. Curve A in the upper portion of FIG. 5 represents the variation with time of a flash bulb (e.g. an AG 1 flash bulb). Curve B represents the exposure light level impinging on the camera film, the total exposure light shown by area D. Light represented by area C is lost due to the increasing aperture of the diaphragm. Curve B' represents the conclusion of exposure process as the shutter closes. Light level F represents the intensity at which the trigger circuit is tripped. Time span E is a constant value of the circuit and it represents the shutter circuit reaction time.

This embodiment of the invention incorporates a pair of diaphragm vanes similar to those described hereinabove, the difference being that in this case, means are not provided for preventing further change in the diaphragm aperture when a certain light level is detected. Exposure control is instead accomplished by providing means for closing the shutter once a sufficient light level is detected for proper exposure. The lower portion of FIG. 5 shows the time sequence of operations of this embodiment. Thus, prior to exposure, shutter blade 101 is cocked open and diaphragm vanes 102 and 103 are in an overlapping position such that an aperture is formed. Upon commencement of the exposure process as in the first embodiment the flash lamp is fired and the vanes 102 and 103 begin to slide in outward directions with aperture forming cutouts 104 and 105 cooperating to form a continuously enlarging aperture 106. When the trigger circuit detects the level of light sufficient for proper exposure, i.e. light level F, and after the passing of circuit reaction time E, the shutter 101 closes. Although any well-known shutter construction may be used, the structure may be such that shutter 101 is mounted on pin 107 which, when the shutter is cocked, is under torsional tension about its longitudinal axis (such as by a spring bias). When the shutter is released, the pin 106 rotates about its axis to rotate shutter 101 across the aperture and thereby terminate exposure. The control circuit for the shutter is preferably of the type shown in FIG. 4 to operate a shutter releasing solenoid in a known manner, but any conventional trigger circuit may be employed. Thereafter, the diaphragm vanes and shutter blade return to their initial position, in a known manner, for example, with film wind.

It can be seen that exposure area D of the graphical illustration in the upper portion of FIG. 5 is increased as a result of time lag E. Thus, at close subject distances, in which case there are short exposures, the increased exposure resulting from time lag E becomes a greater percentage of the total exposure, area A. Conversely, a diaphragm arrangement according to this invention causes area D to decrease from the maximum possible value, as shown by area C, and the percentage decrease in area D increases for short exposure. Thus, the decrease in area D by area C compensates for the increase in area D due to the time lag E, and the proper exposure at all times is achieved.

As has been seen, an important aspect of this embodiment also is the increased depth of field which is most apparent with the short exposure times accompanying closeup shots. Thus, it is possible to provide a single focus setting for almost all flash exposures within the effective range of flash conditions.

The invention has been described in detail with particular reference to preferred embodiments thereof, but it will be understood that variations and modifications can be effected within the spirit and scope of the invention as described hereinabove and as defined in the appended claims.

I claim:

1. An exposure control apparatus for use in a camera, comprising:
   diaphragm means movable from a normally closed position to an open position for defining an adjustable exposure aperture;
   means to actuate said diaphragm means to move from its normally closed position to initiate an exposure interval;
   photoresponsive control means for engaging and locking said diaphragm means in an open position after actuation thereof in response to detection of a predetermined level of light;
   shutter means movable between uncovering and covering positions with respect to said exposure aperture; and
   means to actuate said shutter means to move from its uncovering to its covering position to terminate an exposure a predetermined time after the diaphragm means has been actuated to initiate the exposure.

2. An exposure control apparatus according to claim 8 wherein said diaphragm means comprises a pair of overlapping vanes, the leading end of at least one of said vanes having a concave portion cooperating with the leading edge of the other one of said vanes to define the aperture and at least one of said vanes is movable relative to the other of said vanes to determine the exposure aperture size.

3. An exposure control apparatus according to claim 1 wherein said photoresponsive control means comprises a trigger circuit including a photosensitive member and electromagnetic means energized when the photosensitive member detects a predetermined level of illumination, said electromagnetic means cooperating with said diaphragm to lock the diaphragm when said electromagnetic means is energized.

4. An exposure control apparatus according to claim 3 wherein said diaphragm means comprises a magnetizable member in contact with at least one pole of said electromagnetic means.